United States Patent
Verma

(10) Patent No.: US 10,152,405 B2
(45) Date of Patent: *Dec. 11, 2018

(54) APPLICATION TESTING SYSTEM AND METHOD

(71) Applicant: JPMorgan Chase Bank, N.A., New York, NY (US)

(72) Inventor: Naveen Verma, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,301

(22) Filed: Sep. 15, 2017

(65) Prior Publication Data
US 2018/0024912 A1    Jan. 25, 2018

Related U.S. Application Data

(63) Continuation of application No. 14/837,110, filed on Aug. 27, 2015, now Pat. No. 9,798,650.

(51) Int. Cl.
*G06F 9/44* (2018.01)
*G06F 11/36* (2006.01)

(52) U.S. Cl.
CPC ........ *G06F 11/3664* (2013.01); *G06F 11/362* (2013.01); *G06F 11/3668* (2013.01); *G06F 11/3684* (2013.01); *G06F 11/3688* (2013.01); *G06F 11/3692* (2013.01)

(58) Field of Classification Search
CPC .............. G06F 11/3664; G06F 11/362; G06F 11/3668
USPC .................................................. 717/125, 124
See application file for complete search history.

(56) References Cited

U.S. PATENT DOCUMENTS

| 6,775,824 | B1 * | 8/2004 | Osborne, II | G06F 11/3664 714/46 |
| 7,228,524 | B2 * | 6/2007 | Bailey | G06F 11/3696 714/38.1 |
| 8,205,191 | B1 * | 6/2012 | Kolawa | G06F 11/368 717/124 |
| 2003/0009709 | A1 * | 1/2003 | Belenger | G06F 11/3664 714/37 |

(Continued)

OTHER PUBLICATIONS

Zeginis et al., "A User-Centric Multi-PAAS Application Management Solution for Hybrid Multi-Cloud Scenarios" (Year: 2013).*

(Continued)

*Primary Examiner* — Phillip H Nguyen
(74) *Attorney, Agent, or Firm* — Greenblum & Bernstein, P.L.C.

(57) ABSTRACT

Embodiments of the present invention are directed to a computer implemented web based application testing system and method for testing at least one software application. The system and method receiving at least one test selection from a user using a user interface at a display device. The test selection may include at least one of a feature, a scenario, a background and a predefined condition. A feature file generation engine may then generate at least one feature file based on the test selection. Also, the feature file may be stored in a non-transitory computer memory. A feature file execution engine may execute the feature file and generate at least one execution result. A reporting engine may then generate a report based on the execution result. The execution result may then be displayed at the web dashboard.

20 Claims, 5 Drawing Sheets

(56) References Cited

U.S. PATENT DOCUMENTS

2004/0103396 A1* 5/2004 Nehab ................ G06F 11/3684
717/127

OTHER PUBLICATIONS

Orso et al., "Software Testing: A Research Travelogue (2000-2014)" (Year: 2014).*

* cited by examiner

APPLICATION TESTING SYSTEM AND METHOD

RELATED APPLICATIONS

"This application claims priority to and is a Continuation Application of U.S. patent application Ser. No. 14/837,110, filed on Aug. 27, 2015."

TECHNICAL FIELD

Embodiments of the present invention are directed to a dashboard for the cucumber software with the goal of allowing non-technical users to verify the functionality of software systems given different scenarios.

BACKGROUND OF THE INVENTION

Cucumber is a software tool that computer programmers use for testing other software. It runs automated acceptance tests written in a behavior--driven development (BDD) style. Cucumber is written in the Ruby programming language. Cucumber projects are available for other platforms beyond Ruby. Cucumber allows the execution of feature documentation written in business-facing text. Tests are written in plain language based on the BDD style of 'Given', 'When', 'Then', which any layperson can understand. Test cases are then placed into feature files that cover one or more test scenarios. Cucumber interprets the tests into the specified programming language and uses a programming language (e.g., Selenium, Watir, Capybara, Perl, PHP, Python, .Net etc.) to drive the test cases in a browser.

The BDD 'Given', 'When', 'Then' syntax is designed to be intuitive. 'Given' provides context for the test scenario about to be executed, such as the point in your application that the test occurs as well as any prerequisite data. 'When' specifies the set of actions that triggers the test, such as user or subsystem actions. 'Then' specifies the expected result of the test. This BDD syntax is written in feature files which are an essential part of cucumber. A feature gives information about the high level business functionality and the purpose of Application under test. Everybody should be able to understand the intent of feature file by reading the first Feature step. This part is basically kept brief. For example, a feature may he "Login Functionality Feature." Cucumber also uses the term scenario to describe a particular functionality which is under test. By seeing the scenario, a user may be able to understand the intent behind the scenario and what the test is all about. Each scenario should follow the 'Given', 'When', 'Then' syntax. A scenario may he written in a feature file, as follows:

Feature: Login Functionality Feature
Scenario: Login Functionality
Given user navigates to ABC.COM
When user logs in using Username as "USER"
And password as "password"
Then login should be successful
And Home page should be displayed Once a feature file is created, a user may write software code in order to satisfy the scenario being tested. The user may then run the feature file and watch it fail. The user may then write an automation script with the template provided by Cucumber. The behavior of the application may then be satisfied by the test script.

In order to use Cucumber, a user must know how to write the Cucumber feature file. This is a drawback for business users or other non-technical users who do not know how to write the feature file because it makes them dependent on software developers in order to verify the software system being tested. The non-technical users must rely on the software developers to test the tested system for various scenarios, parameter values, etc. Thus, there exists a need for a system that will bridge the gap between business users and Cucumber. This Cucumber dashboard system may let on-technical users create, update and dry run Cucumber test cases for various scenarios, parameter values, etc. That is, the Cucumber dashboard system may let a user perform the following tasks without having any knowledge of Cucumber: create a new feature file, update an existing feature file, and run acceptance test cases with different scenarios and different values.

BRIEF SUMMARY OF THE INVENTION

In accordance with exemplary embodiments of the present invention, there is provided a computer implemented application testing system for testing at least one software application. In one aspect of the invention, the system implements a web dashboard for receiving at least one test selection from a user using a user interface at a display device. The test selection may include at least one of a feature, a scenario, a background and a predefined condition. A feature file generation engine may then generate at least one feature file based on the test selection. Also, the feature file may be stored in a non-transitory computer memory. A feature file execution engine may execute the feature file and generate at least one execution result. A reporting engine may then generate a report based on the execution result. The execution result may then be displayed at the web dashboard.

In a further aspect of the invention, a computer implemented application testing method is provided for testing at least one software application. The method receives at least one test selection from a user using a user interface at a display device. The test selection may include at least one of a feature, a scenario, a background and a predefined condition A feature file generation engine may then generate at least one feature file based on the test selection. Also, the feature file may be stored in a non-transitory computer memory. A feature file execution engine may execute the feature file and generate at least one execution result. A reporting engine may then generate a report based on the execution result. The execution result may then he displayed at the web dashboard.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a system and method for an Application Testing System that is used for testing an application (software system), and thus improves the performance of the application and corresponding infrastructure, and further reduces the complexity of analyzing such performance. The system and method receive input from the user regarding their system configuration and performance objectives. Based on the user input, the system and method decide create a feature file that can be executed by Cucumber. The results of the execution of the feature file by Cucumber may then be displayed at a web dashboard.

Figure 1A:
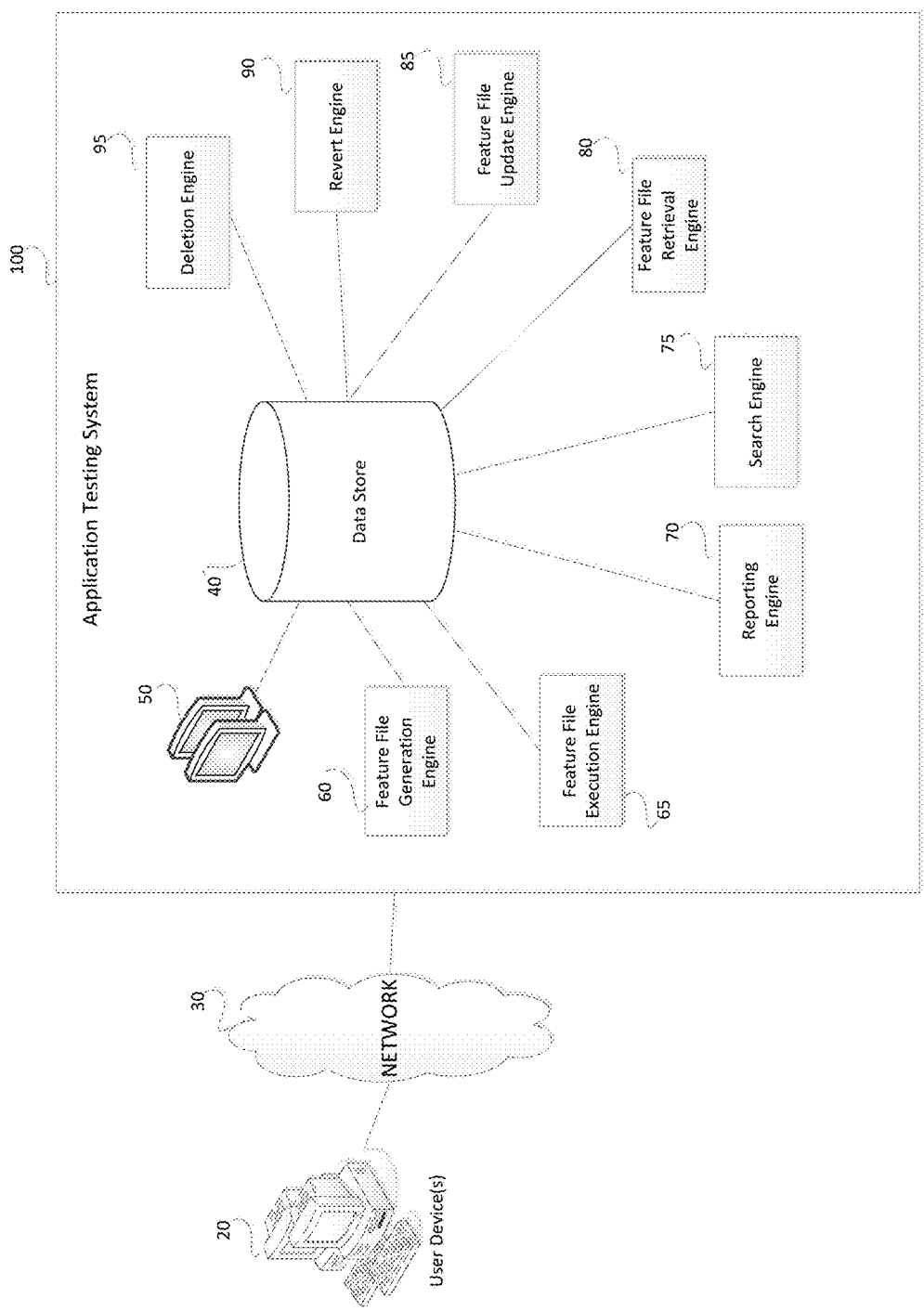
FIG. 1A is a block diagram illustrating an operating environment for an Application Testing System in accordance with an embodiment of the invention.

FIG. 1A is a block diagram illustrating an operating environment for an Application Testing System in accordance with an embodiment of the invention. The Application Testing System 100 is connected through a communications medium over a Network 30, such as the internet, an intranet, a local-area-network (LAN), a wide-area-network (WAN), etc., to one or more User Devices 20. The User Devices 20 may allow a user to enter information regarding the application to be tested and the various details of the test itself.

The Application Testing System 100 includes a Data Store 40, a Feature File Generation Engine 60, a Feature File Execution Engine 65, a Reporting Engine 70, a Search Engine 75, a Feature File Retrieval Engine 80, a Feature File Update Engine 85, a Revert Engine 90, a Deletion Engine 95, and one or more Web Dashboards 50. In an embodiment of the invention, the Data Store 40 may be a database that is local to the Application Testing System 100 and that stores data to be used by the Application Testing System 100 to perform the testing of an application and infrastructure.

A user may access the Application Testing System 100 using a web browser. In an embodiment of the invention, a user is prompted to provide authentication information before access to the Application Testing System 100 is granted. Examples of authentication information include, but are not limited to, username, user id, password, biometrics, etc. Once a user is authenticated, he/she may be able to perform several actions using the Web Dashboard(s) 50. For example, a user may be able to create and execute a feature file. A Web Dashboard for receiving information regarding system configuration and testing objectives is described in greater detail in reference with FIG. 2

After receiving such input, the Feature File Generation Engine 60 may generate one or more feature files. For example, let's say that the user wants to test the scenario when a user is not signed up with an application. The user may enter the information related to the test case using the Web Dashboard(s) 50.

The Feature File Generation Engine 60 may use the information provided by the user to generate a feature file, as below:

Scenario: User is not signed up
Given no user exists with an email of email@person.com
When I go to the sign in page
And I sign in as email@person.com/password
Then I should see "Bad email or password"
And I should not be signed in The Feature File Generation Engine 60 may also use the information provided by the user to generate a step definition in a programming language, for example, as shown below:

```
@Given("^ no user exists with an email of email@person\\.com$")
public void no_user_exists_with_an_email_of_email_person_com( )
throws Throwable {
    // Write code here that turns the phrase above into concrete actions
    throw new PendingException( );
}
@When("^ I sign in as email@person\\.com/password$")
public void i_sign_in_as_email_person_com_password( ) throws
Throwable {
    // Write code here that turns the phrase above into concrete actions
    throw new PendingException( );
}
@Then("^ I should see \"Bad email or password\\?$")
public void i_should_see Bad_email_or_password( ) throws Throwable {
    // Write code here that turns the phrase above into concrete actions
    throw new PendingException( );
}
```

The Feature File Execution Engine 65 may then dry run the Cucumber test cases based on the feature file created by the Feature File Creation Engine 60. The Reporting Engine may then generate one or more results based on the execution of the Cucumber test cases by the Feature File Execution Engine 65. The user may be able to customize the output generated upon execution of the feature file. The user may also be able to specify that certain test cases should be skipped for execution. This allows a non-technical user (e.g., a business analyst, an operations user. etc.) to create and/or edit feature files and see the results instantly rather than waiting for a technical team to promote the changes to evaluate the result.

A user may also be able to search for one or more feature filed previously created and stored in the Application Testing System 100 using the Search Engine 75. The user may be able to specify one or more criteria for searching the feature files using the Web Dashboard(s) 50. For example, the user may be able to search using one or more of the following criteria: the date of creation of a feature file, the date of last execution of the feature file, the user who created the feature file, the last user who executed the feature file, the application(s) being tested by the feature file, the tag(s) associated with the feature and/or the scenario, etc. The Feature File Retrieval Engine 80 may then retrieve one or more feature files from the Data Store 40 that match the search criteria provided by the user. The Web Dashboard(s) 50 may then display the retrieved results to the user. The user may then be able to select the feature file that he/she wants to view. The user may also be able to modify the selected feature file. The Feature File Update Engine 85 may then receive the updated feature file and store the updates in the Data Store 40. In an embodiment of the invention, the Feature File Update Engine 85 may store the updated feature file as a new feature file in the Data Store. The user may provide a new name for the updated feature file using the Web Dashboard(s) 50.

In an embodiment of the invention, the user may be able to revert one or more changes made to a feature file. For example, if the user changed the value associated with one or more data columns in a test scenarios table (discussed below), the user may be able to revert the change using the Web Dashboard(s). The Revert Engine 90 may save the reverted values to the Data Store 40, user may be able to delete one or more feature files using the Deletion Engine 95.

Figure 1B:
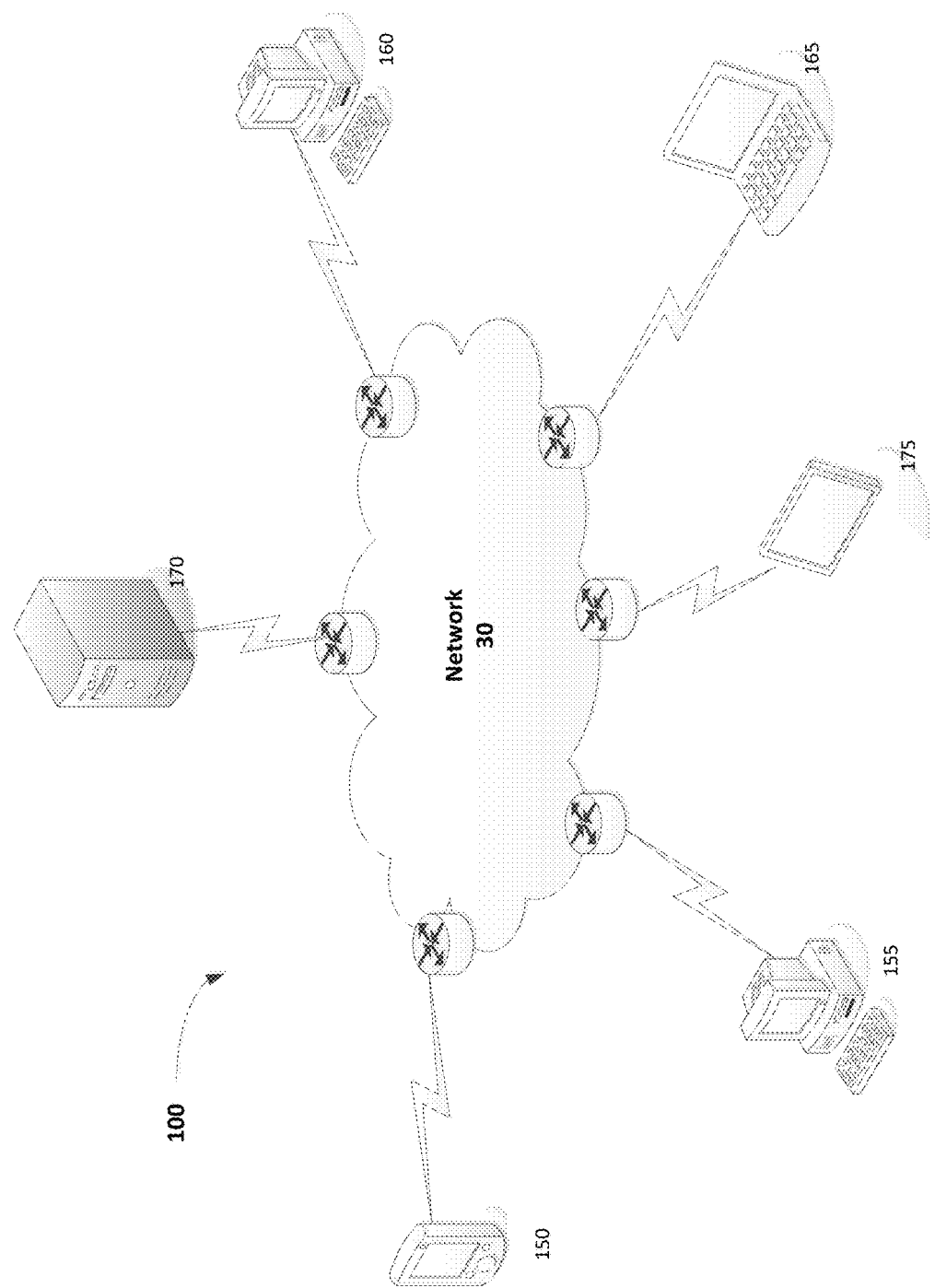
FIG. 1B is a block diagram illustrating an operating environment for an Application Testing System in accordance with an embodiment of the invention.

FIG. 1B is a block diagram illustrating an operating environment for Application Testing System 100 in accordance with an embodiment of the invention. Those skilled in the art will appreciate that the invention may be practiced with various computer system configurations, including hand-held wireless devices such as mobile phones, smart phones or Personal Digital Assistants (PDAs) 150, multi-processor systems 155, microprocessor-based or programmable consumer electronics 160, minicomputers 165, mainframe computers 170, Tablets (iPad™, Samsung Galaxy™, etc.) 175, and the like. The invention may also be practiced in distributed computing environments where tasks are performed by remote processing devices that are linked through a communications network 30. In a distributed computing environment, program modules may be located in both local and remote computer storage media including memory storage devices.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures etc., that perform particular tasks or implement particular abstract data types.

Figure 2:
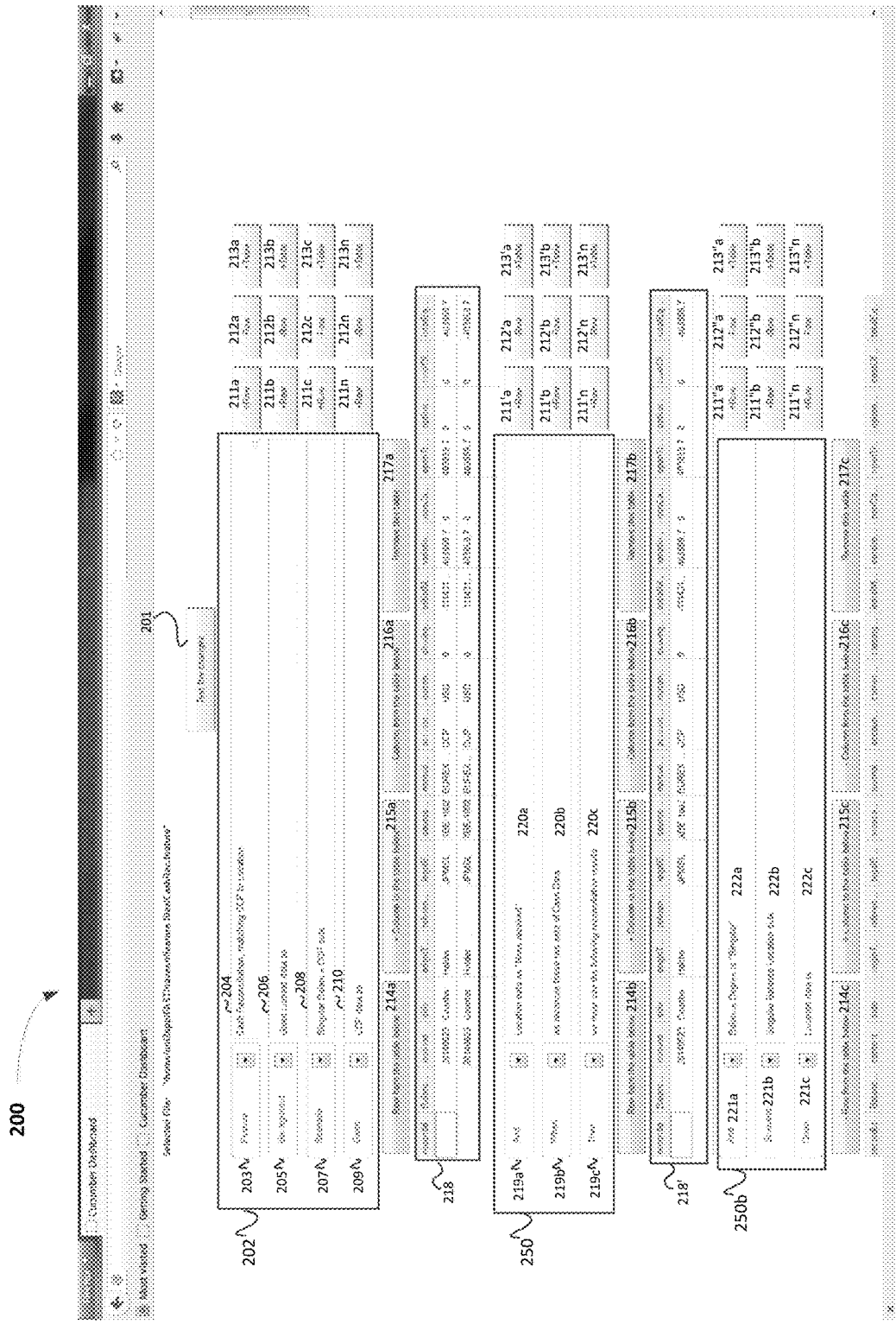
FIG. 2 is a user interface illustrating a Web Dashboard of an Application Testing System in accordance with an embodiment of the invention.

FIG. 2 is a is a user interface illustrating a Web Dashboard of an Application Testing System in accordance with an embodiment of the invention. Specifically, FIG. 2 illustrates a Web Dashboard 200 for receiving information regarding the application to be tested and various testing objectives. The Web Dashboard 200 may contain a section with questions about a Cucumber test case, that is, a Cucumber Test Case section 202. The Cucumber Test Case section 202 may allow a user to specify the feature being tested 203. For example, the user may enter a value in a text box 204 for the feature (e.g., "Cash Reconciliation, matching CCP to Location."). The Cucumber Test Case section 202 may also allow the user to specify a Background 205 of the test case using a text box 206. The Cucumber Test Case section 202 may also allow the user to specify a Scenario 207 of the test case using a text box 208. The user may also specify a precondition by selecting Given from the drop-down 209 and specify the value using a text box 210 and one or more data tables 218. For example, the user may specify that to test the Feature "Cash Reconciliation, matching CCP to Location," the CCP data is as shown in table 218. The user may be able to add rows to the data table using button 214a, add a column to the data table 218 using button 215a, delete a column from the data table 218 using button 216a, or remove the table 218 using button 217a. The user may be able to add and/or remove features, backgrounds, scenarios and given conditions using buttons 211a, . . . 211n and 212a, . . . 212n. The user may be able to associate one or more tables with a feature, background, scenario or given condition using the buttons 213a . . . 213n. The values in table 218 may be manually entered by the user. In an embodiment of the invention, the values in table 218 may be retrieved from a database. Alternatively, the values in table 218 may be copied from another source.

The Web Dashboard 200 may contain a section with additional questions about the Cucumber test case, that is, Additional Conditions sections 250 and 250b. The Additional Conditions sections 250 and 250b may allow a user to specify one or more conditions that may be tested after the requirements of the Cucumber Test Case section 202 have been specified. For example, the Additional Conditions section 250 may allow a user to specify additional conditions where the location data has not been received using fields 219a and 220a. The user may also specify that additional data reconciliation may be performed using fields 219b, 220b, 219c and 220c. For example, the user may be able to specify that the reconciliation results in table 218' may be seen when the two sets of cash data are reconciled using fields 219b, 220b, 219c and 220c. The values in table 218' may be manually entered by the user. In an embodiment of the invention, the values in table 218' may be retrieved from a database. Alternatively, the values in table 218' may be copied from another source. Additionally, the user may be able to add additional conditions using buttons 211'a . . . 211'n and 212'a . . . 212'n. The user may be able to associate one or more tables with a selected condition using buttons 213'a . . . 213'n. The user may be able to add rows to table 218' using button 214b, add a column to table 218' using button 215b, delete a column from table 218' using button 2116b, or remove table 218' using button 217b.

Similarly, the Additional Conditions section 250b may allow the user to specify additional conditions using fields 221a . . . 221c and 222a . . . 222b. Additionally, the user may be able to add additional conditions using buttons 211"a . . . 211"n and 212"a . . . 212"n. The user may be able to associate one or more tables with a selected condition using buttons 213"a . . . 213"n. The user may be able to add rows to a data table using button 214c, add a column to the table using button 215c, delete a column from the table using button 216c, or remove the table using button 217c. In an embodiment of the invention, the user may be able to add one or more tags to the feature file. The tags may be used to organize the features and scenarios. A user may then be able to search for feature files based on the tags.

The user may be able to execute the Cucumber test case by clicking on the button Test the Changes 201. Upon clicking button 201, the Feature File Generation Engine 60 (FIG. 1A) may generate one or more feature files based on the data specified by the user on Web Dashboard 200. The Feature File Execution Engine 65 (FIG. 1A) may then execute the feature file(s to generate one or more reports. In an embodiment of the invent the Web Dashboard 200 may validate the information entered by the user in one or more of the fields for receiving data. For example, the Web Dashboard 200 may verify that the information entered by the user for field 204 is alphanumeric and does not contain any special characters. The Web Dashboard 200 may verify that the feature file is in a correct format and does not contain any incorrect and/or missing information.

Figure 3:
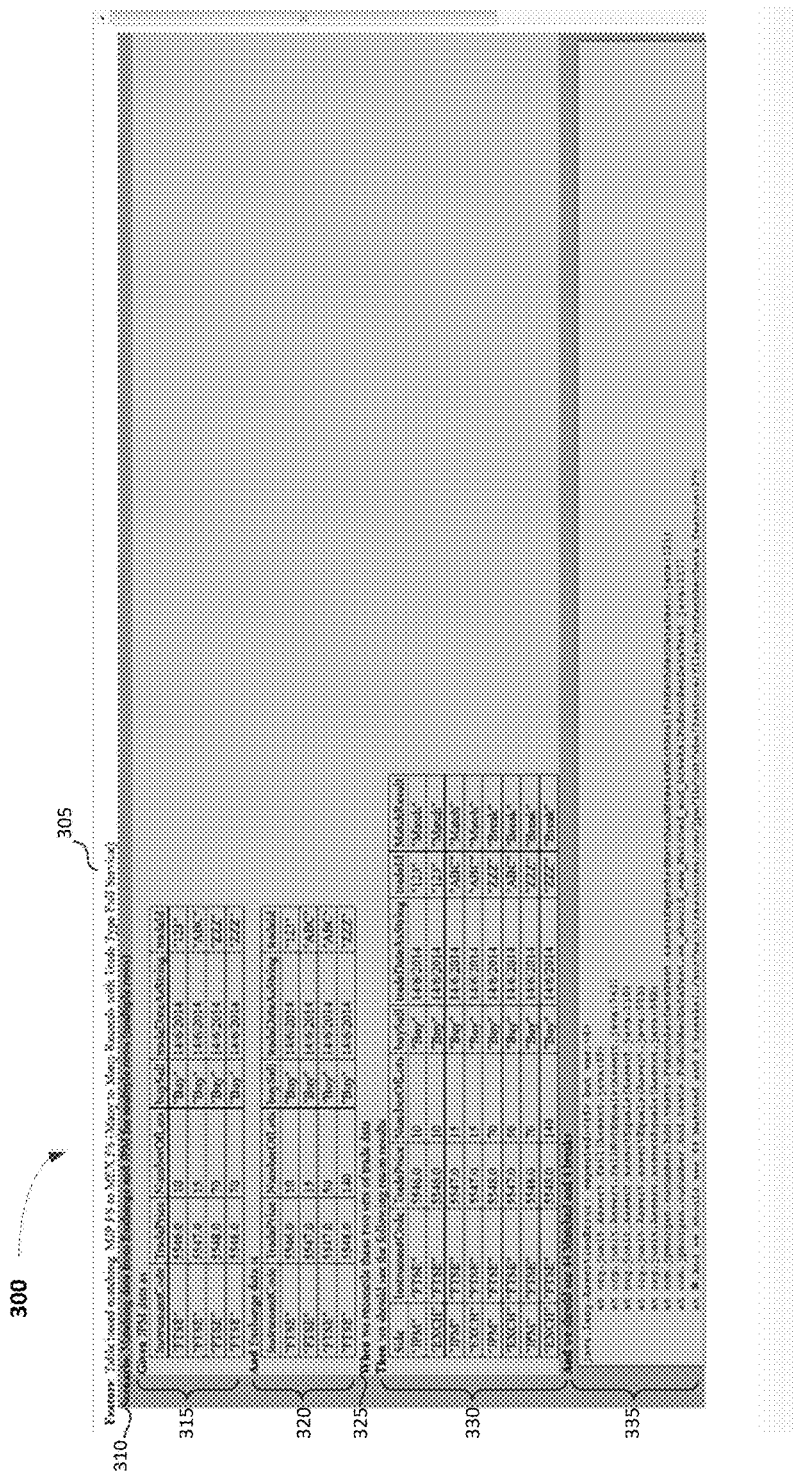
FIG. 3 is a user interface illustrating a Web Dashboard of an Application Testing System in accordance with an embodiment of the invention.

FIG. 3 is a is a user interface illustrating a Web Dashboard of an Application Testing System in accordance with an embodiment of the invention. Specifically, FIG. 3 illustrates a Web Dashboard 300 for displaying report information that is generated upon execution of one or more feature files by the Feature File Execution Engine 65 (FIG. 1A). The Reporting Engine 70 (FIG. 1A) may generate one or more reports based on the execution of the feature file(s). The Web Dashboard 300 may then display the reports to the user(s). Specifically, the Web Dashboard 300 may display the Feature being tested at field 305. The Web Dashboard 300 may also display the Scenario 310 and the Given conditions 315 and 320. The Given conditions 315 and 320 may be in the form of one or more tables. For example, the Web Dashboard 300 may display the results of execution of a feature file that involves table based matching of many to many records with trade type full service records. The two sets of records to be matched may be displayed in tables 315 and 320 respectively. The Web Dashboard 300 may then display that when the two sets of trade data are reconciled (field 325), then the user should see certain results (field 330). The expected results may be in the form of a table 330. For example, the expected results table 330 may display the reconciled results when matching two sets of trade data. The Web Dashboard 300 may also display the number and details to the matched and unmatched records in field 335. The Web Dashboard 300 may also display any failures generated when the feature file is executed (field 335).

Figure 4:
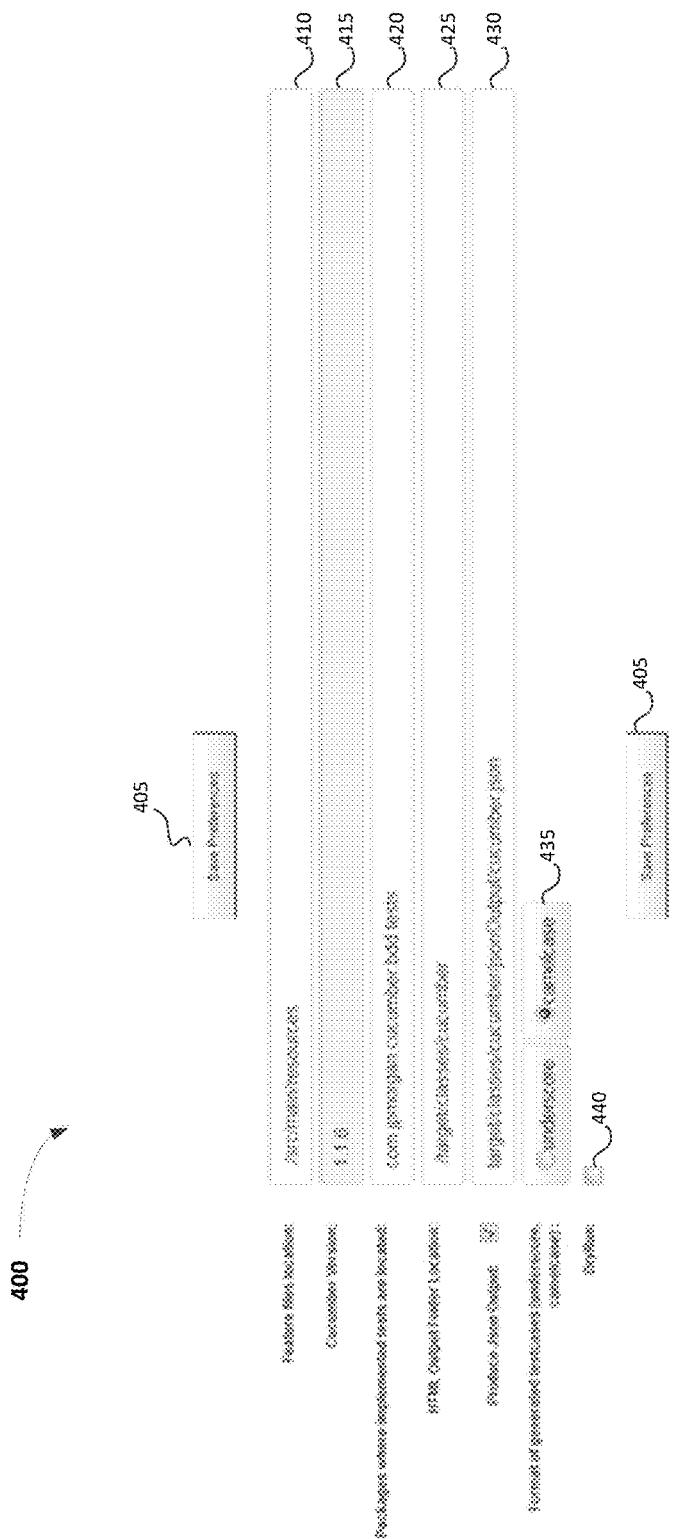
FIG. 4 is a user interface illustrating a Web Dashboard of an Application Testing System in accordance with an embodiment of the invention.

FIG. 4 is a is a user interface illustrating a Web Dashboard of an Application Testing System in accordance with an embodiment of the invention. Specifically, FIG. 4 illustrates a Web Dashboard 400 for receiving and displaying preferences information for the Application Testing System. The Web Dashboard 400 may display the default location for saving the feature files (field 410). The user may be able to update the default location and save the update by clicking on the Save Preferences button (405 and 405'). The Web Dashboard 400 may display the version of the Cucumber testing framework (field 415) and the location of the packages where implemented test files are located (field 420). The Web Dashboard 400 may also display the folder location for the output files/reports (field 425). The Web Dashboard 400 may further allow a user to specify whether a JavaScript (or any other language) file may be created by the Application Testing System and the location of such files (field 430). The Web Dashboard 400 may further allow a user to specify the format of the generated test cases (field 435). For example, the user may select that the format of the generated test cases is underscore. In another example, the user may select that the format of the generated test cases is camel case. The user may further specify that the test cases may be executed as a dry run (field 440). The user may be able to save the preferences by selecting the button Save Preferences (405 and 405').

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described, above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system the Hewlett-Packard UX™ operating system, the Novell Netware™ operating system, the Sun Microsystems Solaris™ operating system, the OS/2TM operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various mmories. However, it is appreciated that the processing performed by two distinct components described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSL for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/©r data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A computer implemented application testing system for testing at least one software system, including at least one computer processor and a non-transitory computer memory, the application testing system comprising:
   a web dashboard for receiving information pertaining to a test selection from a user using a user interface at a display device, the information including identification of a programming language and a format;

a feature file generation engine executed by the computer processor to generate a feature file based on the test selection and the information entered into the web dashboard, wherein generating the feature file includes generating the feature file in a business language and generating a step definition of the feature file in the programming language specified by the user, wherein the feature file is stored in the non-transitory computer memory; and a feature file execution engine to execute the feature file and generate an execution result in the format specified through the web dashboard, wherein the web dashboard displays the execution result.

2. The application testing system of claim 1 further comprising:

a search engine to search for a saved feature file;

a feature file retrieval engine to retrieve at least one selection associated with the saved feature file from the non-transitory computer memory, wherein the web dashboard displays the at least one selection associated with the saved feature file and further receives at least one update to the at least one selection associated with the saved feature file; and a feature file update engine to save the at least one update to the at least one selection associated with the saved feature file in the non-transitory computer memory.

3. The application testing system of claim 2, further comprising:

a revert engine to revert the at least one update to the at least one selection associated with the saved feature file.

4. The application testing system of claim 1 further comprising:

a deletion engine to delete a feature file saved in the non-transitory computer memory.

5. The application testing system of claim 1 wherein the web dashboard displays at least one table containing target results for the software system.

6. The application testing system of claim 5 wherein the web dashboard allows the user to add a column to the at least one table containing target results for the software system.

7. The application testing system of claim 5 wherein the web dashboard allows the user to delete a column from the at least one table containing target results for the software system.

8. The application testing system of claim 5 wherein the web dashboard allows the user to add a row to the at least one table containing target results for the software system.

9. The application testing system of claim 5 wherein the web dashboard allows the user to delete a row from the at least one table containing target results for the software system.

10. The application testing system of claim 5 wherein the web dashboard allows the user to delete the at least one table containing target results for the software system.

11. A computer implemented application testing method for testing at least one software system using an application testing system including at least one computer processor and a non-transitory computer memory, the application testing method comprising:

receiving, using a web dashboard, information pertaining to a test selection from a user using a user interface at a display device, the information including identification of a programming language and a format generating, using a feature file generation engine executing at the computer processor, a feature file based on the test selection and the information entered into the web dashboard, wherein generating the feature file includes generating the feature file in a business language and generating a step definition of the feature file in the programming language specified by the user, wherein the feature file is stored in the non-transitory computer memory; and executing, using a feature file execution engine, the feature file and generating an execution result in the format specified through the web dashboard, wherein the web dashboard displays the execution result.

12. The application testing method of claim 11 further comprising:

searching, using a search engine, a saved feature file;

retrieving, using a feature file retrieval engine, at least one selection associated with the saved feature file from the non-transitory computer memory, wherein the web dashboard displays the at least one selection associated with the saved feature file and further receives at least one update to the at least one selection associated with the saved feature file; and saving, using a feature file update engine, the at least one update to the at least one selection associated with the saved feature file in the non-transitory computer memory.

13. The application testing method of claim 12, further comprising:

reverting, using a revert engine, the at least one update to the at least one selection associated with the saved feature file.

14. The application testing method of claim 11 further comprising:

deleting, using a deletion engine, a feature file saved in the non-transitory computer memory.

15. The application testing method of claim 11 wherein the web dashboard displays at least one table containing target results for the software system.

16. The application testing method of claim 15 wherein the web dashboard allows the user to add a column to the at least one table containing target results for the software system.

17. The application testing method of claim 15 wherein the web dashboard allows the user to delete a column from the at least one table containing target results for the software system.

18. The application testing method of claim 15 wherein the web dashboard allows the user to add a row to the at least one table containing target results for the software system.

19. The application testing method of claim 15 wherein the web dashboard allows the user to delete a row from the at least one table containing target results for the software system.

20. The application testing method of claim 15 wherein the web dashboard allows the user to delete the at least one table containing target results for the software system.

* * * * *